(12) United States Patent
Pullen et al.

(10) Patent No.: US 7,107,468 B2
(45) Date of Patent: Sep. 12, 2006

(54) PEAK CURRENT SHARING IN A MULTI-PHASE BUCK CONVERTER POWER SYSTEM

(75) Inventors: Stuart Pullen, Raleigh, NC (US); Terry J. Groom, Dallas, TX (US)

(73) Assignee: California Micro Devices, Milpitas, CA (US)

(*) Notice: Subject to any disclaimer, the term of this patent is extended or adjusted under 35 U.S.C. 154(b) by 400 days.

(21) Appl. No.: 10/615,486

(22) Filed: Jul. 8, 2003

(65) Prior Publication Data

US 2005/0010825 A1   Jan. 13, 2005

(51) Int. Cl.
G06F 1/26 (2006.01)
G06F 1/32 (2006.01)
G05F 1/24 (2006.01)
G05F 24/02 (2006.01)

(52) U.S. Cl. ............ 713/300; 713/320; 323/259; 323/344

(58) Field of Classification Search ........ 713/300, 713/320
See application file for complete search history.

(56) References Cited

U.S. PATENT DOCUMENTS 5,309,344 A * 5/1994 Smith ................. 363/20
5,627,460 A * 5/1997 Bazinet et al. ........... 323/288
6,088,250 A * 7/2000 Siri ..................... 363/97
6,429,628 B1* 8/2002 Nakagawa ............... 323/224
6,495,995 B1  12/2002 Groom et al. ............ 323/283
6,798,177 B1* 9/2004 Liu et al. ................ 323/222
6,806,689 B1* 10/2004 Schuellein et al. ....... 323/272
2004/0264219 A1* 12/2004 Zhang ................... 363/21.06
2005/0207181 A1* 9/2005 Halberstadt et al. ....... 363/16

* cited by examiner

*Primary Examiner*—Lynne H. Browne
*Assistant Examiner*—Michael J. Brown
(74) *Attorney, Agent, or Firm*—Pillsbury Winthrop Shaw Pittman LLP (57) ABSTRACT

A plurality of constant ON-time buck converters are coupled to a common load. The output of each buck converter is coupled to a common load via a series sense resistor. The regulated output voltage across the common load is compared to a reference voltage to generate a start signal. The start signal is alternately coupled to the controller on each buck converter. The ON-time of a master buck converter is terminated when a ramp signal generated from the regulator input voltage exceeds the reference voltage. All other slave converters have an ON-time pulse started by the start signal and stopped by comparing a sense voltage corresponding to their output current during their ON-time pulse to the peak current in the master converter during its ON-time. A counting circuit with an output corresponding to each of the plurality of buck converters is used to select which buck converter receives the start signal.

32 Claims, 9 Drawing Sheets

PEAK CURRENT SHARING IN A MULTI-PHASE BUCK CONVERTER POWER SYSTEM

TECHNICAL FIELD

The present invention relates in general to controllers for switching regulators and in particular to controllers that set a relatively constant ON-time for the switching devices controlling switching regulators that have multi-phase outputs.

BACKGROUND INFORMATION

Constant ON-time controllers are used in a class of buck regulators that use the output voltage ripple to initiate an ON-time whenever the regulator output voltage falls below a reference voltage. The ON-time is terminated (generating an ON-time pulse) by circuitry in response to other conditions (e.g., level of regulator input). During the ON-time pulse, energy is supplied directly from the regulator input voltage to the regulator output via an electronic switching device. Likewise, when the ON-time pulse has terminated, stored energy from the regulator input voltage is supplied to the regulator output. Most constant ON-time regulators include circuits that adjust the ON-time pulse duration as a function of the regulator input voltage and regulator output voltages, thus resulting in an almost constant frequency as the duty cycle changes. The regulator output voltage ripple is determined to a large extent by the ripple current in the energy storage inductor flowing through the output capacitor's equivalent series resistance (ESR). In applications that require low voltage ripple; the ESR must be very small. This creates two problems for constant ON-time controllers, stability and susceptibility to noise. Some circuits use techniques that supplement the ESR generated ripple with a voltage ramp. These voltage ramps minimize the susceptibility of the controller to noise and thus substantially reduce jitter.

Figure 5:
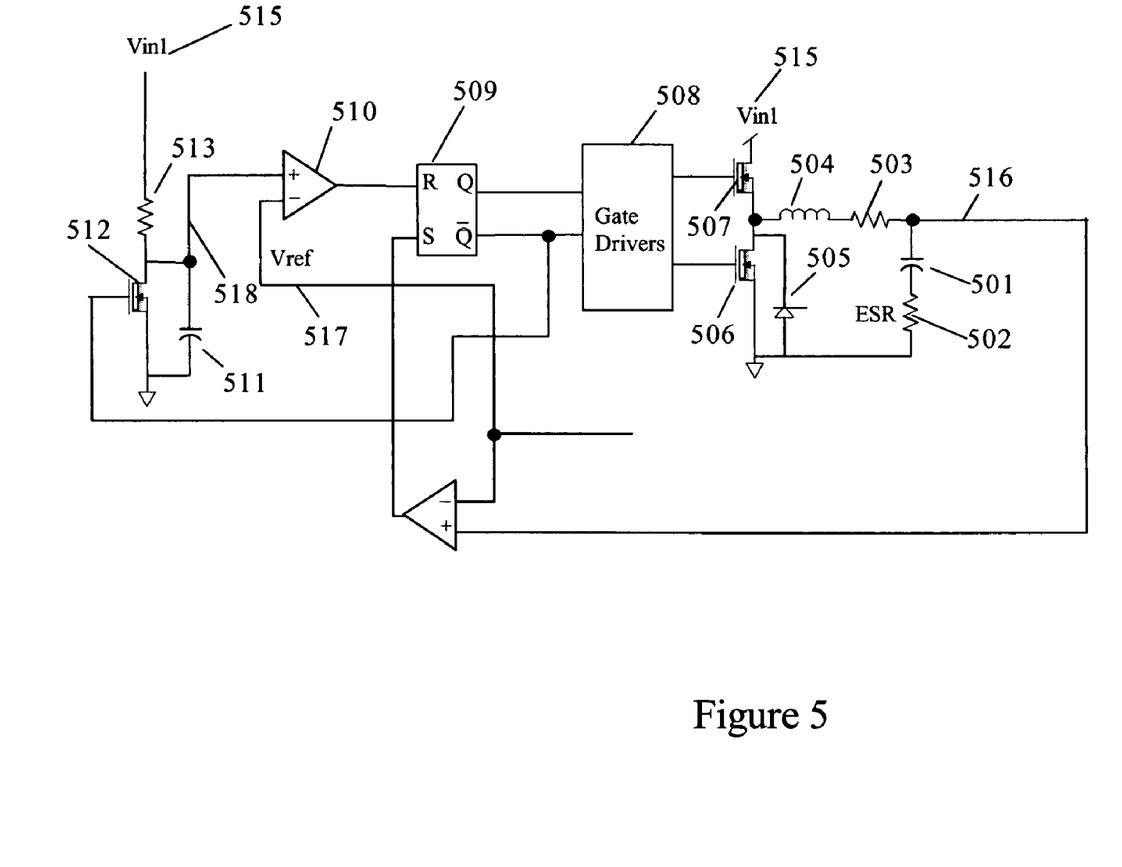
FIG. 5 is a circuit diagram of a constant ON-time converter.

A typical constant ON-time controller for a buck regulator is shown in FIG. 5. The output voltage (Vout) 516 is set by a duty cycle that is defined as the ratio of ON-time of the high-side field effect transistor (FET) 507 to the total switching period. Whenever Vout 516 drops below the reference voltage Vref 517, comparator 508 sets latch 509. Gate drivers 508 turn FET 507 ON thereby charging inductor (L) 504 and delivering current to the load (not shown) coupled to Vout 516. Latch 509 remains set until the voltage 518 across capacitor (C) 511 exceeds Vref 517. At this time, comparator 510 resets latch 509 and gate drivers 500 turn FET 507 OFF and FET 506 ON. The energy stored in L 504 causes the load current to continue to flow to Vout 516. Catch diode (D) 505 insures current in L 504 is not interrupted during switching to minimize transients.

The ON-time (time interval FET 507 is ON) is a function of both Vin 515 and Vref 517. As Vin 515 rises, the ON-time will be shorter since C 511 charges faster. If Vref 517 is increased, C 511 has to charge to a higher voltage to trip the comparator 510, also resulting in a longer ON-time. Thus, the circuitry adjusts the ON-time to minimize the frequency changes (as determined by the time between pulses) that would otherwise result from changes in Vin 515 and Vout 516. To increase the current in inductor (L) 504 in response to a step change in the load (not shown) coupled to Vout 516, the control loop generates more ON pulses per unit time. To decrease the current in L 504, the control loop generates fewer pulses per unit time. Therefore, during transient load steps the frequency is not constant.

Multi-phase buck converters are used in applications that demand high output currents. They may be constructed by connecting two or more buck converters to the same output capacitor. The control loop for a multiphase buck converter must regulate the output voltage and ensure that the inductor in each phase has the same current. Multi-phase buck controllers are popular in low voltage, high current applications that require a fast transient response. They are often used to generate the supply voltage for the central processing unit (CPU) integrated circuit (IC) in desktop and notebook computers. Voltage mode, current mode, and hysteresis type controllers have all been used successfully to control the output voltage in these applications. However, converters with these types of controllers require a second current loop to match the current from each converter since it is desirable to have each converter provide an equal share of the load current. Therefore, in a dual phase buck converter, the energy storage inductor in each converter should normally supply half the load current. Likewise, in a three-phase converter system, the inductor in each phase should normally supply one third of the load current.

Current mode controllers are a popular choice for multiphase controllers because their current loop can regulate the current sharing in each phase. But hysteresis and constant ON-time controllers may also be used when a second current loop is added to force current sharing. Current sharing may be controlled either on an average basis or on a cycle-by-cycle basis. If average current sharing is used, then the bandwidth of the current control loop must be very low. As the current is adjusted by changing the duty cycle, it will take time for the inductor current to change. This delay makes average current sharing difficult to implement. The most likely way to ensure that average current sharing stable is to design the response of the current control loop to be very slow. This may not be desirable since during the occurrence of a current imbalance it will take many cycles for the control loop to correct the imbalance. On the other hand, peak current sharing can control the current sharing on a cycle-by-cycle basis. A system employing peak current sharing is easy to stabilize and can correct for unequal current sharing quickly.

Figure 1A:
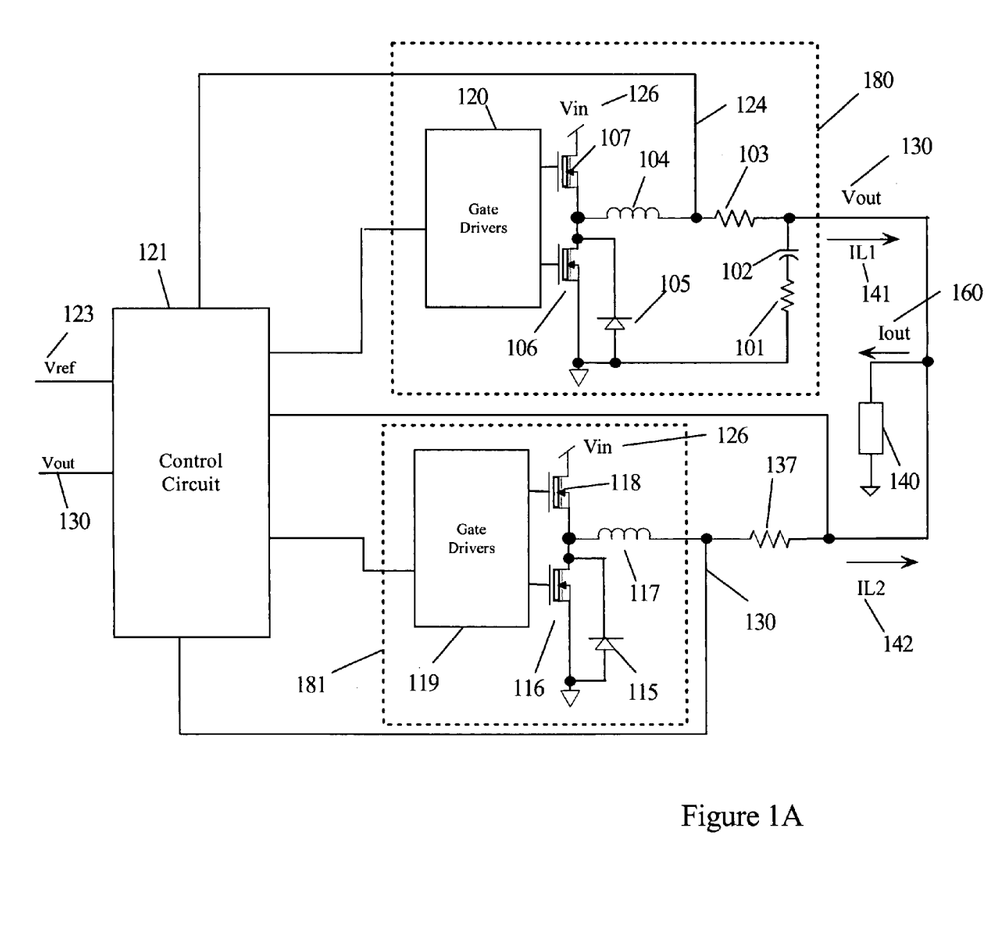
FIG. 1A is a circuit diagram of a typical multiphase constant ON-time controller for a two-phase buck converter.

FIG. 1A is a simplified block diagram of a dual phase buck regulator with constant ON-time control and active current sharing. The output capacitor (C) 102 is usually a network of many capacitors in parallel. The equivalent series resistance (ESR) represented by resistor ESR 101 is the effective series resistance of this capacitor network. ESR 101 is the real part of the complex impedance of the network of parallel capacitors making up C 102. Two sense resistors, R 137 and R 103, provide voltages VR2 127 and VR 1122 that are proportional to the current in inductors 117 and 104 in each phase, respectively. VR1 122 is the difference in potential between node 124 and Vout 130 and VR2 127 is the difference between node 131 and Vout 130. The four field effect transistors (FETs), FET 106, FET 107, FET 116, and FET 118 control the duty cycle of each phase. Diodes 105 and 115 are flyback diodes that insure the currents in the inductors 104 and 117, respectively, are not interrupted. The gate drivers 119 and 120 in phase drive circuits 180 and 181 interface with the control circuit 121 and provide the voltages needed to drive FETs 106, 107, 116 and 118. The control circuit 121 determines which of the two phases, 180 or 181, to turn ON when the output voltage (Vout) 130 falls below the reference voltage (Vref) 123. The output currents IL1 141 and 1L2 I42 combine to provide load current Iout 160 to load 140.

Figure 1B:
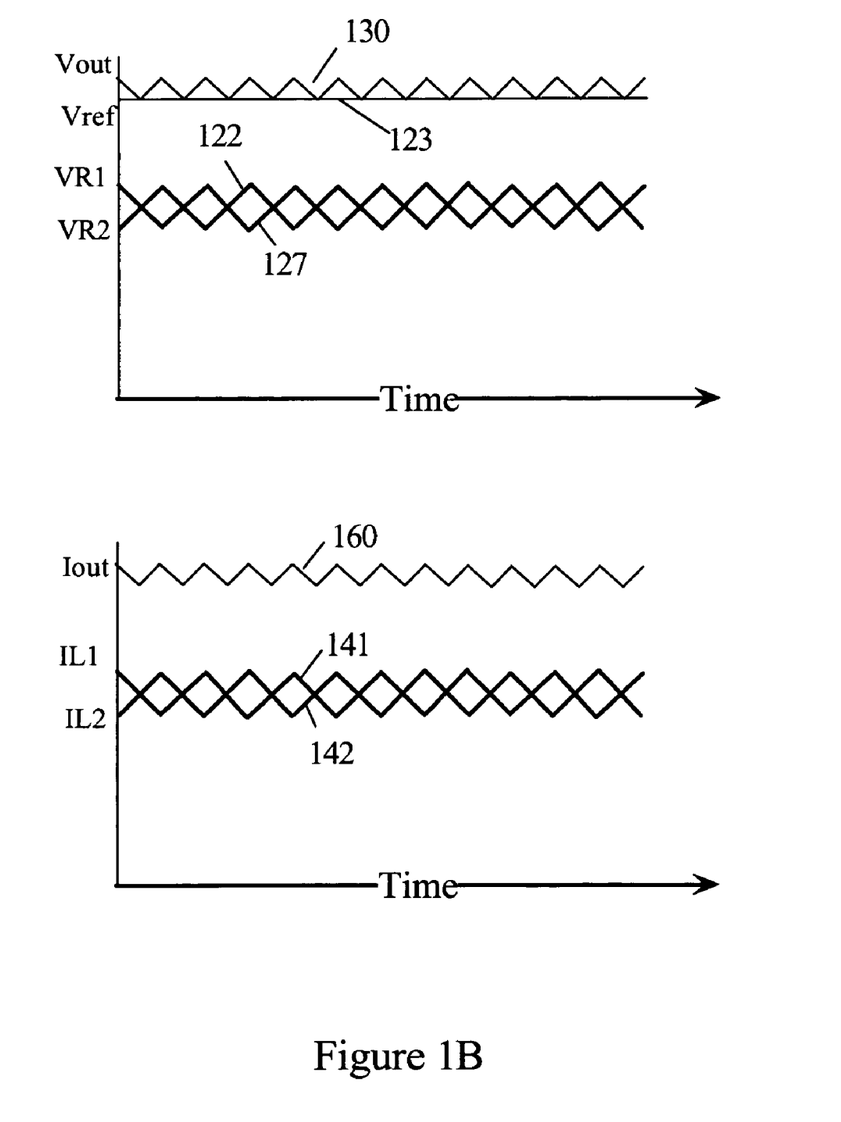
FIG. 1B illustrates waveforms for the two phase buck converter system of FIG. 1A.

FIG. 1B illustrates the timing of two converter phases 180 and 181. The two graphs in FIG. 1B show that by complementary switching the two converter phases 180 and 181, both the amplitudes of the output current ripple (Iout 160) relative to output currents IL1 141 and IL2 142 and output voltage ripple (Vout 130) relative to sense voltages VR1 127 and VR2 122 are cut in half and the ripple frequency is doubled.

Figure 2:
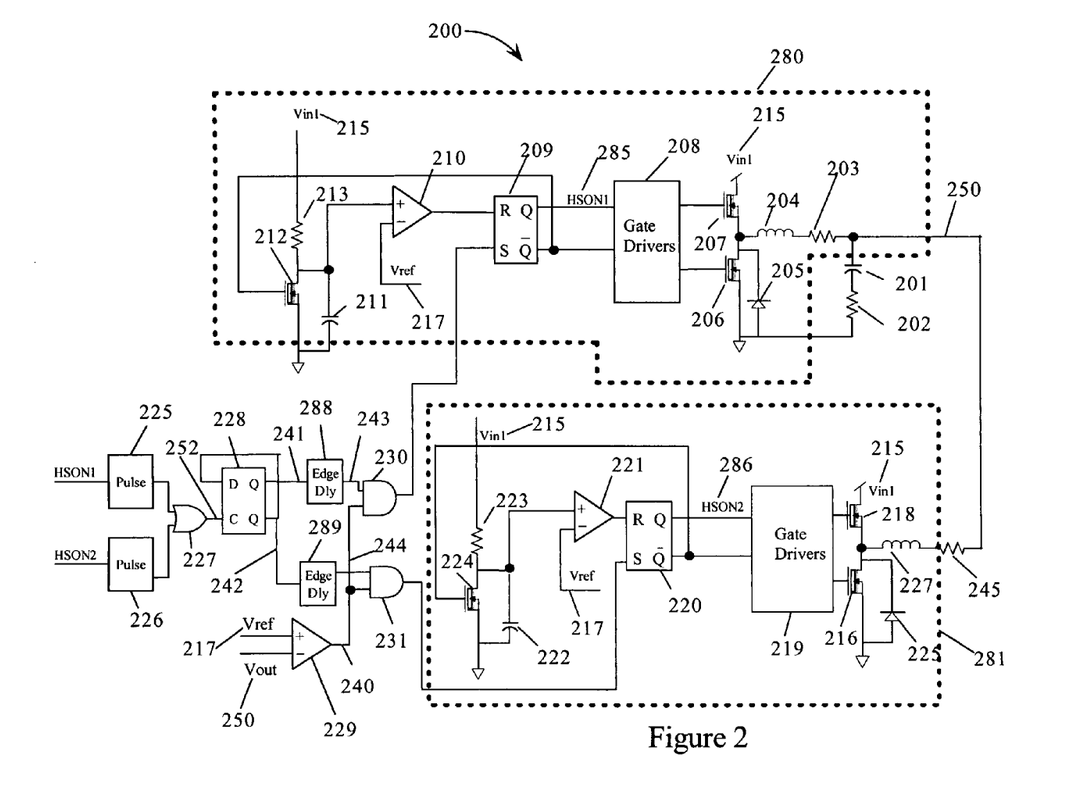
FIG. 2 is a circuit diagram of a multiphase constant ON-time controller for a an open loop two-phase buck converter.

FIG. 2 is a circuit diagram of an open loop constant ON-time buck controller for dual converters. The output 240 of the comparator 229 is coupled to an input of AND gates 230 and 231. The outputs 241 and 242 of flip flop (FF) 228 are coupled to the other inputs of AND gates 230 and 231 respectively. Outputs 241 and 242 alternately turn ON each converter phase (280 and 281) when Vout 250 drops below the reference voltage (Vref) 217. The pulse circuits 225 and 226 and OR gate 227 provide the clock to the FF 228. FF 228 is configured as a "D-type" FF that changes state on each positive clock edge (of its CLK input). Therefore, since each pulse from pulse circuits 225 and 226 are logic ORed in OR gate 227 to form clock 252, each pulse causes outputs 241 and 242 of FF 228 to switch states. When output 242 is logic one, AND gate 231 is enabled and latch 220 in the converter phase 281 is set when the output of comparator 229 (coupled to 240) transitions to logic one. When latch 220 is set, FET 218 turns ON (via gate drivers 219) charging inductor L 227 and providing current to Vout 250. Conversely, if output 241 is logic one, then AND gates 230 is enabled and latch 209 in converter phase 280 is set when the output of comparator 229 transitions to logic one turning ON FET 207 (via nate drivers 208) charging inductor L 204 and providing current to Vout 250. Latches 209 and 220 are reset by comparators 210 and 221 when the voltages on capacitors 211 and 222, respectively, exceed Vref 217. Capacitors 211 and 222 are discharged by FETs 212 and 224. Sense resistors 203 and 245 are used to sense the current in inductors 204 and 227, respectively. FETs 206 and 216 and diodes 205 and 225 insure the currents in the charging inductors are not interrupted. Capacitor 201 is the load filter capacitor and resistor 202 represents its ESR.

In both cases, the ON-time pulse commences by setting a latch 209 for converter phase 280 and latch 220 for converter phase 281. The latch 209 signals gate drivers 208 to turn high-side FET 207 ON and latch 220 signals gate drivers 219 to turn FET 218 ON. The timing circuits (outputs of comparators 210 and 221 respectively) reset each corresponding latch (latch 209 and latch 220, respectively) after a fixed ON-time. Resetting latch 209 turns high-side FET 207 OFF and resetting latch 220 turns FET 218 OFF. Depending on which phase is active, low-side FET 205 and FET 216 are turned ON when corresponding latches 209 and 220 are reset.

The constant ON-time timing circuits are set up so that the ON-time pulses HSON1 285 and HSON2 286 are proportional to the Vref 217 and inversely proportional to Vin 215. Thus, if Vin 215 increases, the current in through R 213 and R 223 will also increase. An increase in Vin 215 will cause capacitors C 211 and C 222 to charge faster resulting in a shorter ON-time. If the Vref 217 increases, C 211 and C 222 will have to charge to a higher voltage to switch comparators 210 and 221, respectively, resulting in longer ON-times. This constant ON-time circuit maintains a nearly constant frequency as Vin 215 and Vref 217 vary. However, circuit 200 does not have adequate performance because even small errors in the ON-time pulse width may result in very large current sharing errors. Because of the possible large current sharing errors, a current control loop (not shown) must be added to actively adjust the pulse width to minimize current sharing errors.

Figure 3:
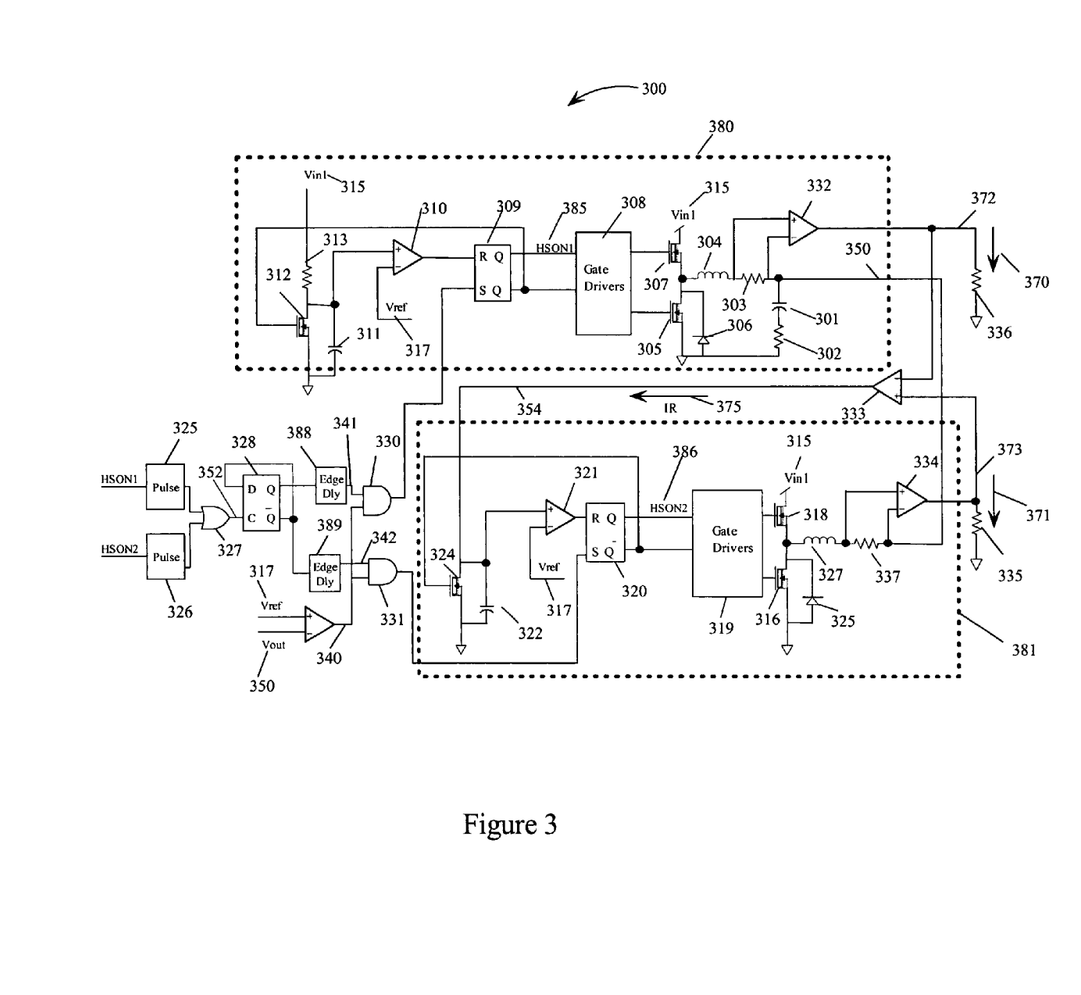
FIG. 3 is a circuit diagram of a multiphase constant ON-time controller for a two-phase buck converter with current balancing feedback.

FIG. 3 is a circuit diagram of circuit 300 that has the function of a closed loop average current sharing constant ON-time buck converter. The output 340 of the comparator 329 is coupled to one input AND gates 330 and 331. The outputs of flip flop (FF) 328 are coupled to positive edge delay circuits 388 and 389. Positive edge delay circuits 388 and 389 delay the rising edges of outputs 341 and 342 which in turn alternately turn ON each converter phase when Vout 350 drops below the reference voltage (Vref) 317. Pulse circuit 325 receives ON-time pulse (HSON1 385) from latch 309. Pulse circuit 326 receives ON-time pulse (HSON2 386) from latch 320. HSON1 385 and HSON2 386 are logic ORed in OR gate 327 to provide the clock to the FF 328. FF 328 is configured as a "D-type" FF that changes state on each positive clock edge. Therefore, since each pulse from pulse circuits are logic ORed in OR gate 327 to form clock 352, each pulse causes the outputs of FF 328 to switch states. When output 341 is logic one, AND gate 330 is enabled and latch 320 in the converter phase 381 is set when the comparator 329 transitions to logic one. When latch 320 is set, FET 318 turns ON charging inductor L 327 and providing current to Vout 350. Conversely, if output 342 is logic one, then AND gate 331 is enabled and latch 309, in converter phase 380, is set when the output of comparator 329 transitions to logic one.

Diodes 306 and 325 insure the currents in inductors 304 and 327 are not interrupted during switching. Load filter capacitor 301 has ESR 302. Gate drivers 308 and 319 provide drive voltages to FETS 305, 307, 316 and 318. FETs 213 and 324 discharge capacitors 311 and 322 in response to reset signals from latches 309 and 320 generated when the voltages of capacitors 311 and 322 exceed Vref 317 and the outputs of comparators 310 and 321 transition to a logic one.

In both cases, the ON-time pulses commence by setting a latch 309 for converter phase 380 and latch 320 for converter phase 381. Latch 309 signals gate drivers 308 to turn high-side FET 307 ON and latch 320 signals gate drivers 319 to turn FET 318 ON in converter phase 381. The timing circuits (output of comparators 310 and 321) then reset each corresponding latch (latch 309 and latch 320, respectively) after a fixed ON-time. Resetting latch 309 turns high-side FET 307 OFF and resetting latch 320 turns FET 318 OFF . Depending on which phase is active, low-side FET 305 and low-side FET 316 are turned ON when corresponding latches 309 and 320 are reset.

If HSON1 385 transitions to logic one, then both inputs 341 and 342 of AND gate 330 are at logic one. The positive transition of HSON1 385 triggers pulse circuit 325, which clocks FF 328 so that its Q output transitions to logic zero thereby degating AND gate 330 thus removing the set input to latch 309. Since the Q output of FF 328 transitions to logic zero, its complementary output (input to positive edge delay circuit 389) transitions to logic one. Without the positive edge delay of Edge Dly 389, converter phase 381 would turn ON as soon as converter phase 380 turned ON and Vref 317 is greater than Vout 350. Edge Dly 388 and Edge Dly 389 guarantee that there will be a period of time when both phases cannot be ON concurrently whenever Vref 317 is greater than Vout 350

The constant ON-time circuit in converter phase 380 is configured such that the ON-time pulse (HSON1 385) is proportional to the Vref 317 and inversely proportional to Vin 315. Thus, if Vin 315 increases the current in through R 313 will also increase. An increase in Vin 315 will cause capacitor C 311 to charge the faster resulting in a shorter ON-time. If the Vref 317 increases, C 311 will have to charge to a higher voltage to switch comparators 310, resulting in a longer ON-time. This constant ON-time circuit maintains a nearly constant frequency as Vin 315 and Vref 317 vary. Converter phase 381 is designed to be a slave to converter phase 380 in that the voltage for charging C 322 to set its ON-time (HSON2 386) is no longer a function of Vin 315 but rather feedback voltage 354.

Transconductance amplifiers (GMA) 332 and GMA 334 each sense the voltage across their corresponding sense resistors R 303 and R 337. GMA 332 and GMA 334 generate currents IR 370 and IR 371, respectively. IR 370 flows through resistor R 336 generating voltage 373 and IR 371 flows through R 335 generating voltage (V) 372. V 372 and V 373 are proportional to the voltage drops across their corresponding sense resistors R 337 and R 303. GMA 333 converts the difference between V 372 and V 373 to a current IR 375, which produces a voltage at node 354 as current IR 375 is integrated by C 322. When FET 324 is turned OFF (HSON2 386 is logic one), C 322 charges to Vref 317 to switch comparator 321 and reset latch 320 terminating the ON-time pulse to converter phase 381.

R 336 is coupled to the negative input of GMA 333 and R 335 is coupled to the positive input of GMA 333. If the current through sense resistor R 303 (converter phase 380) is larger than the current through sense resistor R 337 (converter phase 381), then the feedback is such that current IR 375 decreases thus lengthening the ON-time for converter phase 381 and increasing the current from converter phase 381. The output current of GMA 333 determines the ON-time pulse width of converter phase 381. Thus, GMA 333 will trim the ON-time pulse width of converter phase 381 until its output current substantially matches the output current in converter phase 380. Since the current of GMA 333 is always positive, the current in sense resistor R 303 is always slightly larger (determined by the gain of GMA 333) than the current in sense resistor R 337. The drawback to this technique is that it is hard to stabilize. After an ON pulse is trimmed, the new steady state current will be delayed for several switching cycles. The bandwidth of GMA 333 must be very low or the system may oscillate. Furthermore, since GMA 333 must have a very low bandwidth, it will take many switching cycles for this system to correct for current sharing errors.

Therefore, a need for control circuitry for a multiphase constant ON-time buck controller that insures current matching between the converter phases with small current sharing errors and fast response time to load changes.

SUMMARY OF THE INVENTION

Multiphase buck converters with constant ON-time control are used to provide high current to a common load by summing the current from each buck converter. The converters are normally alternately turned ON such that only one converter is ON at a time during steady state. During start-up or transients load changes there may be periods when both phase may be ON. One converter is the master and its ON-time is proportional to the regulator input voltage and the reference voltage. The ON-time of a slave converter is controller by comparing the present current in a slave converter to a sampled and held measure of the peak current in the master converter. A particular converter's ON-time is started when the output voltage exceeds the reference voltage and it is enabled. The ON-time of a slave converter is terminated when the current in the slave converter exceeds the stored measure of the master's current. Converters are selected by a count signal generated in response to counting logic OR of said ON-time pulses for all the converters.

The foregoing has outlined rather broadly the features and technical advantages of the present invention in order that the detailed description of the invention that follows may be better understood. Additional features and advantages of the invention will be described hereinafter, which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 4A:
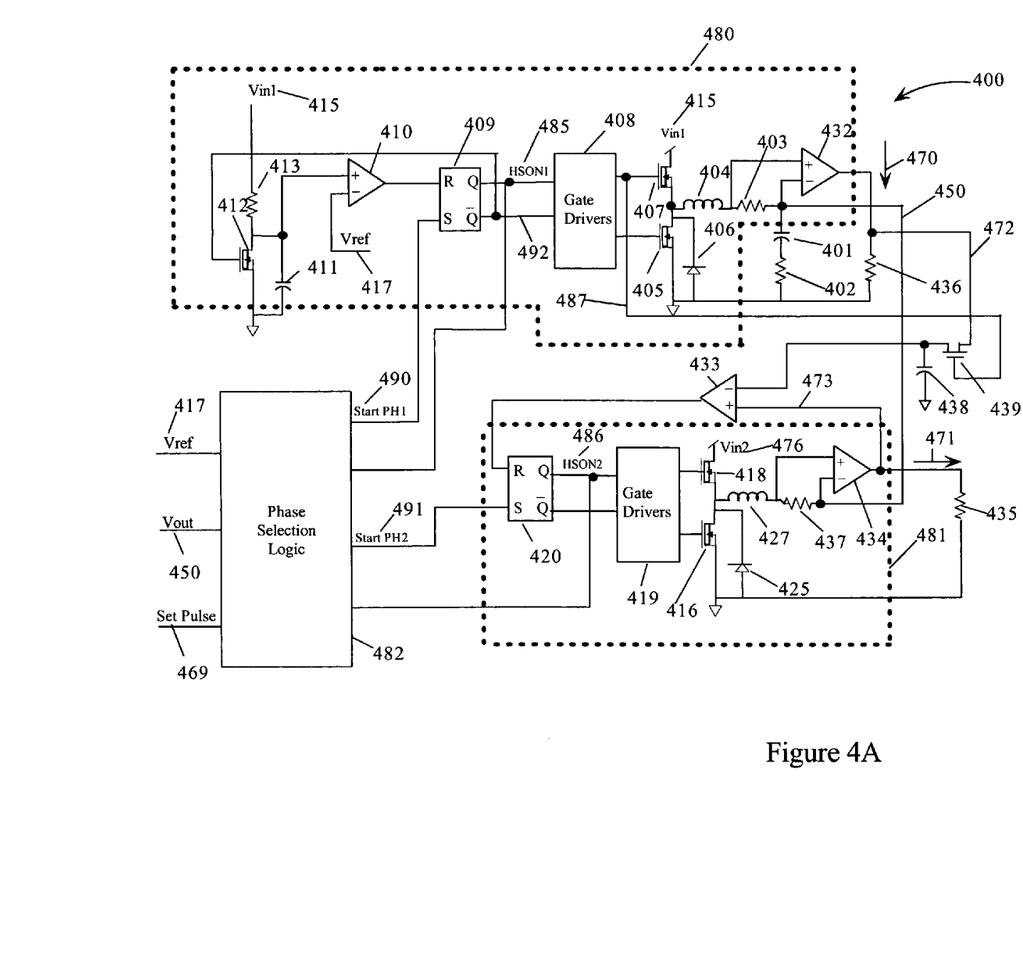
FIG. 4A is a circuit diagram of a multiphase constant ON-time controller for a two-phase buck converter with current balancing feedback according to embodiments of the present invention.

FIG. 4A is a circuit diagram of a two-phase converter 400 with peak current sharing and constant ON-time control according to embodiments of the present invention. Phase selection logic (PSL) 482 receives voltage reference (Vref) 417, Vout 450, ON-time pulse for converter phase 480 (HSON1 485) and the ON-time pulse for converter phase 481 (HSON2 486) and generates a start signal for converter phase 480 (Start PH1 490) and a start signal for converter phase 481 (Start PH2 491). Load filter capacitor 401 coupled to output 450 has corresponding ESR 402.

In both cases, ON pulses commences by setting a latch 409 for converter phase 480 and latch 420 for converter phase 481. The latch 409 signals gate drivers 408 to turn high-side FET 407 ON and latch 420 signals gate drivers 419 to turn FET 418 ON. The timing circuitry then resets latch 409 after a fixed ON-time while latch 420 is reset by the output of comparator 433. Resetting latch 409 turns high-side FET 407 OFF and resetting latch 420 turns FET 418 OFF. Low-side FET 405 and low-side FET 416 are turned ON respectively when latch 409 and latch 420 are reset.

The constant ON-time circuit in converter phase 480 comprises FET 412, resistor R 413, capacitor C 411 and comparator 410. This circuitry operates such that HSON1 485 is proportional to the Vref 417 and inversely proportional to Vin 415. Thus, if Vin 415 increases, the current in through R 413 will also increase. An increase in Vin 415 will cause capacitor C 411 to charge faster resulting in a shorter ON-time. If Vref 417 increases, C 411 will have to charge to a higher voltage to switch comparators 410, resulting in a longer ON-time. This constant ON-time circuit maintains a nearly constant frequency as Vin 415 and Vref 417 vary.

GMA 432 and GMA 434 each sense the voltage across their corresponding sense resistors R 403 and R 437. GMA 432 and GMA 434 generate currents IR 470 and JR 471, respectively. IR 470 flows through resistor R 436 generating voltage (V) 472 and IR 471 flows through R 435 generating voltage V 473. V 472 and V 473 are proportional to the voltage drops across their corresponding sense resistors R 403 and R 437. Appropriate differential amplifiers may also be used in place of GMA 432 and GMA 434. V 473 is proportional to the real-time current in converter phase 481 and is coupled directly to the positive input of GMA 433. Voltage V 472 is coupled to the sample and hold circuit formed by FET switch 439 and capacitor C 438. Due to out of phase switching, the peak current in converter phases 480 and 481 occur at different times. Therefore, the sample and hold circuit comprising FET switch 439 and C 438 samples the voltage across R 436. FET switch 439 is turned OFF (by signal 487) when the high-side FET 407 turns OFF. Thus, C 438 holds the peak voltage across R 436 corresponding to the peak current in inductor L 404. When converter phase 481 turns ON, the peak voltage (corresponding to the peak current) from converter phase 480 is compared to the real-time voltage across R 435 (corresponding to the current in L 427). When the voltage across R 435 is greater than the voltage on C 438, the comparator 433 resets the latch 420 ending HSON2 486.

Circuit 400 in FIG. 4 is a dual phase buck converter system according to embodiments of the present invention. Converter phase 480 is the "master" as its ON-time pulse HSON1 485 is controlled only by Vin 415, Vref 417 and Start PH1 490. Converter phase 481 is called the "slave" as its ON-time pulse HSON2 486 is controlled by the mismatch in current sharing between the two converter phases. Each ON-time pulse HSON2 486 in converter phase 481 is truncated when the current in L 427 exceeds the current sampled in L 404 from the previous cycle.

The following describes an initial ramp up of Vout 350 for dual converters 400. In FIG. 4, converter phase 480 has input voltage Vin1 415 and converter phase 481 has input voltage Vin2 476. Input voltages Vin1 415 and Vin2 476 are not necessarily equal and may be unregulated or may be from regulated sources with voltage levels that are higher than desired for Vout 450. At a start up condition, Vref 417 is greater than Vout 450 and neither converter phase 480 nor 481 is ON. In this case, HSON1 485 would be at logic zero and FET 412 would be ON thereby discharging capacitor 411 to substantially zero volts. Vref 417 would then cause the output of comparator 410 to transition to logic zero removing the reset from latch 409. If Vref 417 is also greater than Vout 450, then circuitry in PSL 482 would transition Start PH1 490 to logic one setting latch 409. Then, HSON1 485 transitions to logic one turning FET 407 ON via gate drivers 408. Current from Vin1 415 would start increasing Vout 450. When latch 409 is set, its complementary output 492 transitions to logic zero turning FET 412 OFF and allowing capacitor 411 to charge towards Vin1 415. When the positive input of comparator 410 exceeds Vref 417, the ON-time pulse (HSON1 485) for converter phase 480 terminates. Then, FET 406 turns ON and the current stored in inductor 404 circulates to Vout 450 via FET 406. Diode 405 provides a conduction path during the transient turn ON of FET 406. Amplifier 432 senses the current from converter phase 480 by the voltage across resistor 403. GMA 432 may be a voltage amplifier or a transconductance amplifier as explained relative to FIG. 3. The output of GMA 432 is coupled to resistor 436. FET 407 is turned ON by signal 487, which also turns FET 439 ON . When FET 439 turns ON, it "samples" the output of GMA 432 by charging capacitor 438, which is coupled to the negative input of comparator 433. When FET 439 turns OFF, capacitor 438 holds this voltage which is representative of the peak current in converter phase 480 during its previous ON cycle. Capacitor 438 is coupled to the negative input of comparator 433. The output of comparator 433 is coupled to the reset input of latch 420 in converter phase 481. If there is yet no current from converter phase 481, then the current in resistor 435 is zero and the reset to latch 420 is logic zero.

If Vref 417 is greater that Vout 450 and the current in converter phase 481 is less than the sampled measure of the peak current in converter phase 480, then Start PH2 491 may also transition to logic one setting latch 420. HSON2 486 then transitions to logic one and FET 418 turns ON by gate drivers 419 allowing Vin2 476 to also supply current to Vout 450 during the initial turn ON of system 400. As long as the current in converter phase 481 is less than the sampled peak current in converter phase 480, converter phase 481 will remain ON. Converter phase 480 will turn ON and OFF by the action of Start PH1 490 setting latch 409 and comparator 410 resetting latch 409. When Vout 450 finally exceeds Vref 417, then current sharing regulation will operate to cause the current in converter phase 481 to increase until it equals the peak current in the previous cycle of converter phase 480.

Circuit 400 may be easily expanded to more converter phases by adding more slave converters (e.g., similar to converter phase 481) and expanding PSL 482 to generate the appropriate start-phase signals. In steady state, the start-phase signals (e.g., Start PH1 490, and Start PH2 491) are generated sequentially by PSL 482 to activate each converter phase one at a time in order to preserve out-of-phase switching. Additional logic may be added to generate additional start-phase signals for additional converter phases. The stop signal (not shown) for resetting the latch generating the ON-time pulse for additional phases would be generated by adding additional comparators (e.g., comparator 433) for comparing the continuous current in an added phase to the sampled current in the master converter phase 480. In embodiments of the present invention, one phase may be turned ON successively during a transient condition.

Figure 4B:
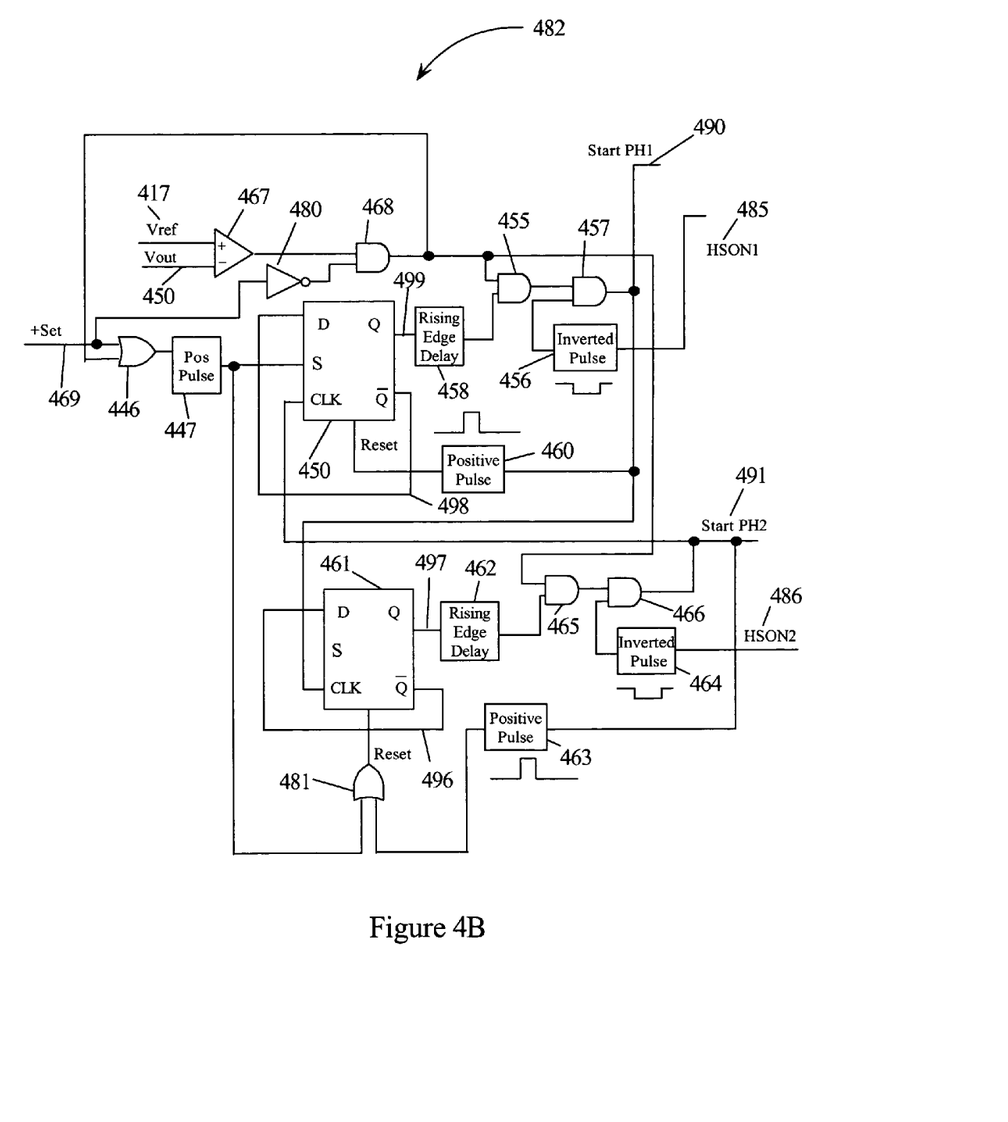
FIG. 4B is logic circuit diagram of circuitry in the phase selector of FIG. 4A.

FIG. 4B has detailed circuitry of PSL 482 that is used to explain how the Start PH1 490 and Start PH2 491 signals are generated from HSON1 485, HSON2 486, Vref 417 and Vout 450. Set Pulse 469 is generated by an initialization condition (e.g., power-on reset) and is used to set FFs 450 and 461 into known initial states. When Set Pulse 469 transitions to a logic one, it triggers positive pulse 447 to generate a positive pulse to set FF 450 directly and to reset FF 461 via logic gate 481. The Q output of FF 450 transitions to logic one and this rising edge is delayed in rising edge delay (RDL) circuit 458. During the time duration of Set Pulse 469, inverter 480 degates AND gate 468. If Vref 417 is greater than Vout 450 (generally true during start up), then the output of comparator 467 is logic one. As soon as Set Pulse 469 transitions to logic zero, AND gate 468 enables AND gate 455. The output of inverted pulse 456 is logic one (HSON1 485 is logic zero since initially it is assumed that neither converter phase is ON). Therefore, when Set Pulse 469 transitions to logic zero, Start PH1 490 transitions to logic one initiating an ON-time pulse (HSON1 485) for converter phase 480 (See FIG. 4A). When Start PH1 490 transitions to logic one, it triggers positive pulse 460 which resets FF 450 causing its Q output 499 to transition to logic zero which in turn causes Start PH1 490 to transition to logic zero removing the set from latch 409 (See FIG. 4A).

When Start PH1 490 transitions to logic one, it clocks FF 461. Since FF 461 was initially reset, its negative output 496 is logic one. A positive input to the CLK of FF 461 sets its positive output 497 to the value of its D input. With this configuration, each time the CLK of FF 461 transitions to logic one, the state of FF 461 flips to an opposite state. In this case, Q output 497 transitions to logic one. Positive transitions of output 497 are delayed by rising edge delay (RDL) 462. If Vref 417 is greater that Vout 450 (See FIG. 4A), then when Start PH2 491 transitions to logic one converter phase 481 also ON. When Start PH2 491 transitions to logic one it clocks FF 450 via its CLK input. Since FE 450 was reset by positive pulse 460, it is again set and output 499 transitions to logic one. During initial ramp up of Vout 450, it will take several cycles before Vout 450 exceeds Vref 417, therefore, output 499 again transitions to logic one. If convert phase 480 has not turned OFF, latch 409 (See FIG. 4A) will remain set. As soon as comparator 410 transitions to logic one, resetting latch 409, HSON1 485 transitions to logic zero triggering inverted pulse 456 which degates AND gate 457 causing Start PH1 490 to transition low removing the set to latch 409 for a OFF blanking period equal to the pulse width of inverted pulse 456. At the end of inverted pulse 456, Start PH1 490 will again transition to logic one starting a new ON time for converter phase 480. Since converter phase 480 is turned ON with Start PH1 490 and turned OFF by a one shot timing circuit ( FET 412, R 413, C 11, and comparator 410) it will continue to switch ON and OFF during initial ramp-up of Vout 450. Converter phase 481 turns ON with Start PH2 491 and does not turn OFF until its output current sensed via resistor 435 and GMA 434 is greater that the sampled peak value of the current in converter phase 480. Every time converter phase 480 turns OFF its current decays while the current from converter phase 481 continues increasing. When converter phase 480 turns back ON again it therefore supply less of the total load current to Vout 450. When Vout 450 exceeds Vref 417 the output of comparator 467 transitions to logic zero degating AND gate 468 and thus AND gates 455 and 465. Both converter phases are prevented from turning ON after they turn OFF due to Vout 450 exceeding Vref 417. When Vout 450 again drops below Vref 417, the output of comparator 467 transitions to logic one and the output of AND gate 468 transitions to logic one. This positive transition via OR gate 446 triggers positive pulse 447 to set FF 450 and reset FF 461 and the cycle will repeat until Vout 450 again exceeds Vref 417. Inverted pulse 464 and AND gate 466 operate in converter phase 481 as inverted pulse 456 and AND gate 457 in converter phase 480.

Figure 4C:
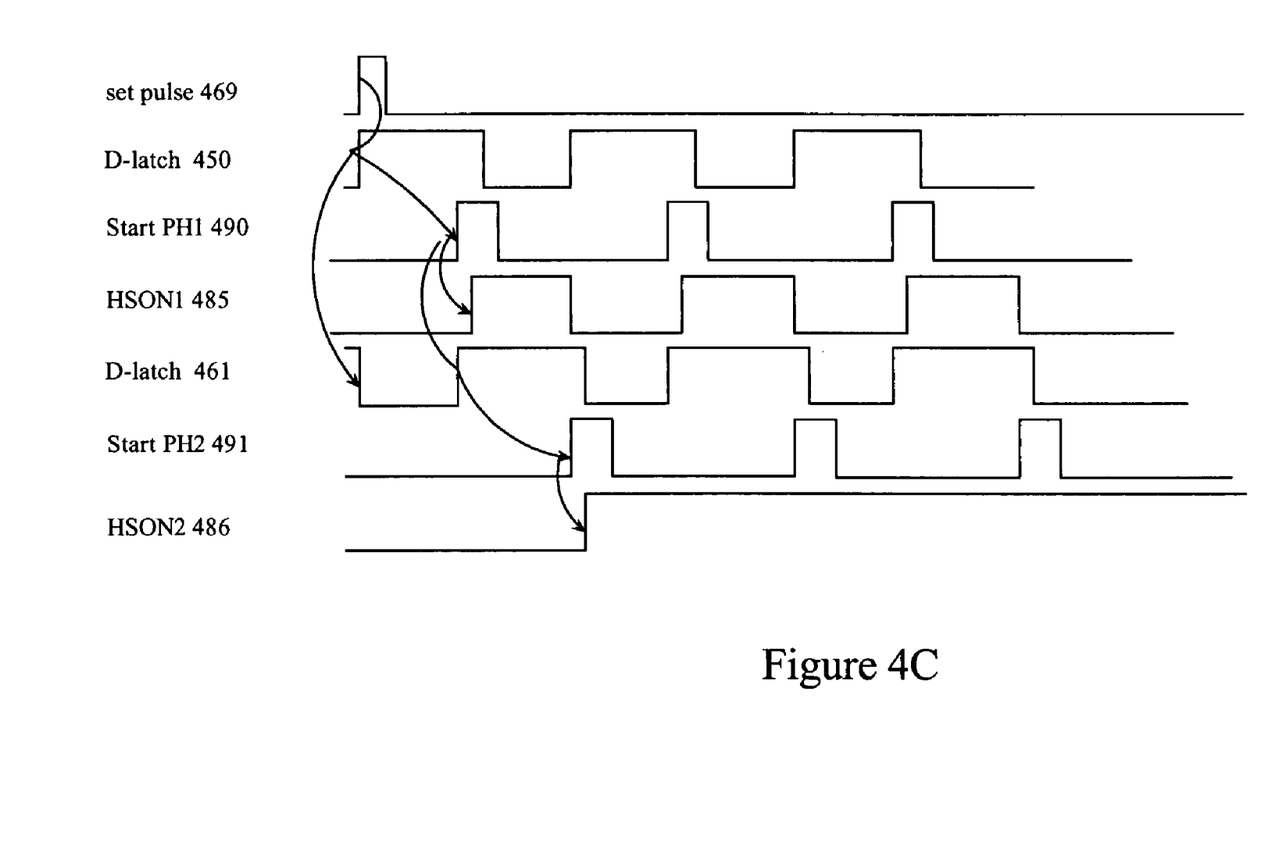
FIG. 4C is a timing diagram of selected signals from FIG. 4B.

FIG. 4C is a timing diagram of selected signals of circuit 400 in FIG. 4B. These signals illustrate a key difference between embodiments of the present invention and the prior art. On a power-on-reset set pulse 469 initializes circuit 400 by setting latch 450 and resetting latch 461. During set pulse 469, AND 468 is degated which in turn degates AND gates 455 and 465. When latch 450 is set, its Q output transitions to logic one. Rising edge delay 458 delays the positive transition of latch 450, which in turn delays the transition of Start PH1 490 to logic one. Start PH1 490 sets the ON-time latch of phase one (shown in FIG. 4A) and HSON1 485 transitions to logic one. HSON1 485 triggers positive pulse 460 and resets D-latch 450. HSON1 485 remains logic one for the ON-time of phase one. The ON-time of phase one is determined by other circuitry in the controller for the regulator (See FIG. 4A). Start PH1 490 clocks D-latch 461 when it transitions to logic one. Since D-latch 461 was initially reset, it now sets. After the rising edge delay 462, Start PH2 491 transitions to logic one starting the ON-time for phase two. Since the ON-time of phase two is terminated only when the current in phase two equals a sampled current in phase one, HSON2 486 remains at logic one while HSON1 485 continues as a repetitive pulse. Prior art circuits have cross blanking circuitry that prevents both phases from being ON at the same time. The present invention allows both phase to be ON and thus has a faster transient response at start-up and during fast load changes. In some systems, the regulator input voltage for phase one is larger that for phase two (e.g., 12 volts and 5 volts). Using embodiments of the present invention the 12 volts of phase one can ramp the inductor current quickly whereas the 5 volts of phase two cannot because it presents much less voltage to charge the inductor when the high side FET (e.g., 418 of FIG. 4A) is ON.

Figure 6:
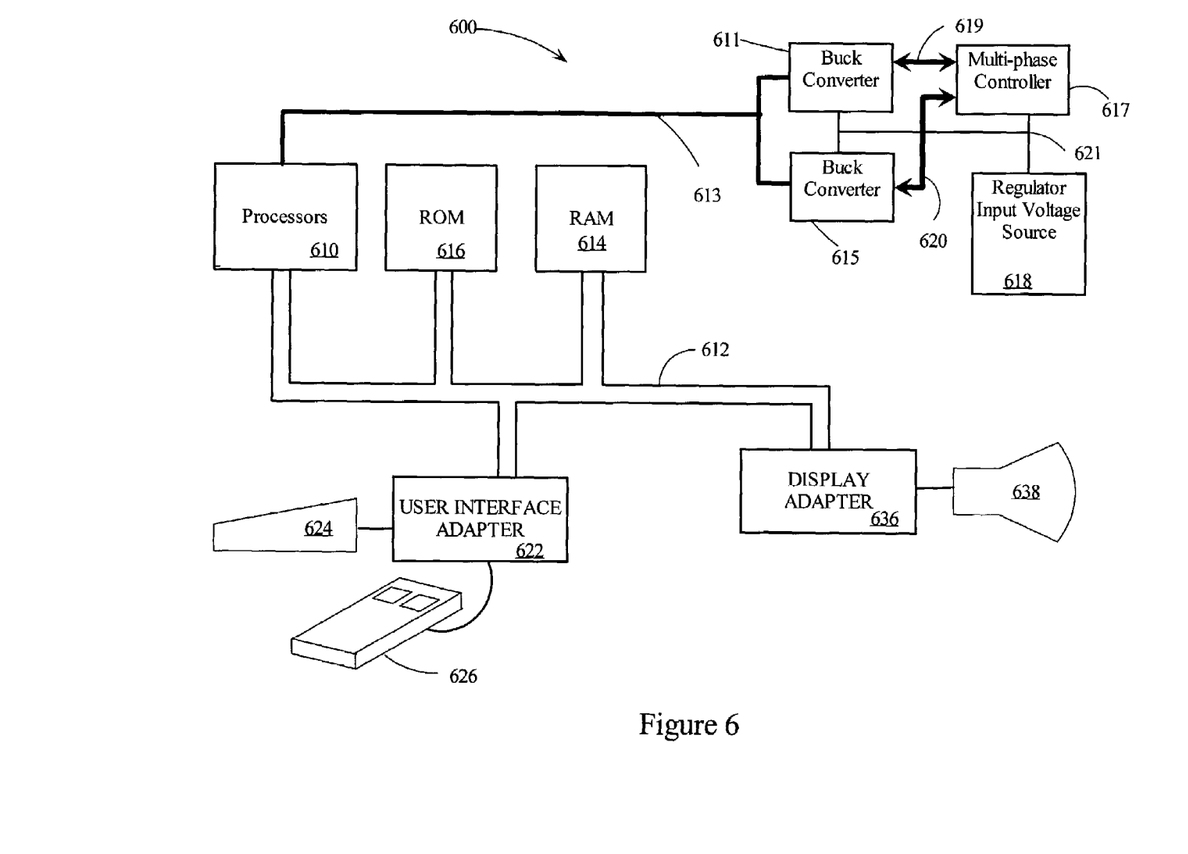
FIG. 6 is a block diagram of a computer system suitable for practicing the present invention.

A representative hardware environment for practicing the present invention is depicted in FIG. 6, which illustrates a typical hardware configuration of a system in accordance with the subject invention having multiple processing units (processors) 610 and a number of other units interconnected via system bus 612. The system shown in FIG. 6 includes random access memory (RAM) 614, read only memory (ROM) 616, user interface adapter 622 for connecting keyboard 624 and mouse 626 and/or other user interface devices such as a touch screen device (not shown) to bus 612, and display adapter 636 for connecting bus 612 to display device 638. A power supply system comprising multiple buck regulators 611 and 615 and multi-phase constant ON-time controller 617 receives regulator input voltage 621. Controller 617 is coupled to buck converters 611 and 615 with control signals 619 and 620, respectively. Control signals 619 and 620 are generated according to embodiments of the present invention for providing equal current sharing to power bus 613. For example, system 600 may require dual power supply circuits to provide the necessary current for its various units (e.g., multiple processors 610) on power bus 613. Processors within multiple processors 610 may be brought on and off-line as needed by reducing or shutting off their respective power inputs thus causing step changes in load current which buck converters 611 and 615 supply. Using embodiments of the present invention, buck converters 611 and 615 respond quickly to the new current requirement while maintaining equal current sharing.

Although the present invention and its advantages have been described in detail, it should be understood that various changes, substitutions and alterations can be made herein without departing from the spirit and scope of the invention as defined by the appended claims.

What is claimed is:

1. A multiphase buck converter system with peak current sharing comprising:
    a first buck converter coupled to a first regulator input voltage and generating a first converter output voltage for powering a common load in response to a first ON-time pulse set to a first logic state by a first start signal and set to a second logic state by a first stop signal, wherein said first converter output voltage supplies energy to said common load directly from said first regulator input voltage when said first ON-time pulse has said first logic state and said first converter output voltage supplies stored energy from said first regulator input voltage when said first ON-time pulse has said second logic state;
    a second buck converter coupled to a second regulator input voltage and generating a second converter output voltage for powering said common load in response to a second ON-time pulse set to a first logic state by a second start signal and set to a second logic state by a second stop signal, wherein said second converter output voltage supplies energy to said common load directly from said second regulator input voltage when said second ON-time pulse has said first logic state and said second converter output voltage supplies stored energy from said second regulator input voltage when said second ON-time pulse has said second logic state;
    start circuitry for generating said first and second start signals in response to a regulated voltage across said common load, a reference voltage, and said first and second ON-time pulses;
    first stop circuitry for generating said first stop signal in response to said first regulator input voltage and said reference voltage; and
    second stop circuitry for generating said second stop signal in response to a first output current from said first converter output voltage supplied to said common load, a second output current from said second converter output voltage supplied to said common load, and said first ON-time pulse.

2. The converter system of claim 1, wherein said first stop circuitry comprises:
    a capacitor charged by a current from said first regulator input voltage when said first ON-time pulse has said first logic state and discharged when said first ON-time pulse has said second logic state; and
    first compare circuitry for comparing said reference voltage to a capacitor voltage across said capacitor and generating said first stop signal, wherein said first stop signal has a first logic state when said capacitor voltage is greater than said reference voltage and a second logic state when said capacitor voltage is less than said reference voltage.

3. The converter system of claim 2, wherein said second stop circuitry comprises:
    peak circuitry for generating a peak voltage proportional to a peak value of said first output current;
    first sense circuitry for generating a first sense voltage proportional to said second output current; and
    second compare circuitry for comparing said first sense voltage to said peak voltage and generating said second stop signal, wherein said second stop signal has a first logic state when said first sense voltage is greater than said peak voltage and a second logic state when said first sense voltage is less than said peak voltage.

4. The converter system of claim 3, wherein said first sense circuitry comprises:
    a first sense resistor having a first terminal coupled to said first converter output voltage and a second terminal coupled to said common load; and
    a differential amplifier having a positive input coupled to said first terminal of said first sense resistor and a negative input coupled to said second terminal of said first sense resistor, and an output generating said first sense voltage.

5. The converter system of claim 4, wherein said differential amplifier is a transconductance amplifier for converting a voltage across said first sense resistor to a first sense current coupled to a first resistor thereby generating said first sense voltage across said first resistor.

6. The converter system of claim 3, wherein said peak circuitry comprises:
    a second sense resistor having a first terminal coupled to said second converter output voltage and a second terminal coupled to said common load;
    a differential amplifier having a positive input coupled to said first terminal of said second sense resistor and a negative input coupled to said second terminal of said second sense resistor, and an output generating said second sense voltage; and
    a sampling circuit for tracking said second sense voltage when said first ON-time pulse has said first logic state and holding a value of said second sense voltage as said peak voltage when said ON-time pulse has said second logic state.

7. The converter system of claim 6, wherein said sampling circuit comprises:
    a capacitor having a first terminal coupled to ground and a second terminal; and
    an electronic switch for coupling said second sense voltage to said first terminal of said capacitor when said first ON-time pulse has said first logic state, said capacitor holding said value of said sense voltage as said peak voltage when said first ON-time pulse has said second logic state.

8. The converter system of claim 6, wherein said differential amplifier is a transconductance amplifier for converting a voltage across said second sense resistor to a second sense current coupled to a second resistor thereby generating said second sense voltage across said second resistor.

9. The converter system of claim 3, wherein said start circuitry comprises:
    a compare circuit for comparing said regulated voltage across said common load to said reference voltage and generating a gate signal having a first logic state when said reference voltage is greater than said regulated voltage and a second logic state when said reference voltage is less than said regulated voltage;
    a first select circuit for generating said first start signal in response to said first ON-time pulse, said gate signal, said second start signal, and an initialization signal; and
    a second select circuit for generating said second start signal in response to said second ON-time pulse, said gate signal, said first start signal, and said initialization signal.

10. The converter system of claim 9, wherein said first select circuit comprises:
- a compare logic circuit for generating a compare logic signal in response to said regulated voltage across said common load, said reference voltage, and said initialization signal;
- an initialization pulse circuit for generating an initialization pulse in response to said initialization signal and said compare logic signal;
- a first logic circuit for generating said first start signal in response to said first ON-time pulse, said initialization pulse, and said second start signal; and
- a second logic circuit for generating said second start signal in response to said second ON-time pulse, said initialization pulse, and said first start signal.

11. The converter system of claim 10, wherein said compare logic circuit comprises:
- a comparator for comparing said reference voltage to said regulated voltage across said common load and generating a compare output signal having a first logic state when said reference voltage is greater than said regulated voltage across said common load and a second logic state when said regulated voltage across said common load is greater than said reference voltage; and
- a logic gate generating said compare logic signal as logic combination of said compare output signal and said initialization signal.

12. The converter system of claim 11, wherein said initialization pulse circuit comprises:
- a logic gate generating a start converter signal as a logic combination of said initialization signal and said compare logic signal; and
- a pulse circuit generating said initialization pulse in response to a logic transition of said start converter signal.

13. The converter system of claim 12, wherein said first logic circuit comprises:
- a flip-flop having an output, an inverted output, a data input, a set input, a reset input, and a clock input, wherein said set input is coupled to said initialization pulse, said clock input is coupled to said second start signal, and said inverted output is coupled to said data input;
- a positive pulse circuit having an input coupled to said first start signal and an output coupled to said reset input of said flip-flop and generating a reset pulse in response to a logic transition of said first start signal;
- an inverted pulse circuit having an input coupled to said first ON-time pulse and an output generating an inverted pulse, wherein said inverted pulse circuit generates said inverted pulse in response to a logic transition of said first ON-time pulse;
- a third logic circuit having a first input coupled to said compare logic signal, a second input, a third input coupled to said output of said inverted pulse circuit, and generating said first start signal; and
- a delay circuit having an input coupled to said output of said flip-flop and a delay output coupled to said second input of said third logic circuit, wherein said delay circuit selectively delays a logic transition of said delay output.

14. The converter system of claim 12, wherein said second logic circuit comprises:
- a positive pulse circuit having an input coupled to said second start signal and an output generating a reset pulse on a logic transition of said second start signal;
- a logic gate having a first input coupled to said initialization pulse, a second input coupled to said output of said positive pulse circuit, and an output generating a gated reset pulse as a logic combination of said initialization pulse and said output of said positive pulse circuit;
- a flip-flop having an output, an inverted output, a data input, a reset input, and a clock input, wherein said reset input is coupled to said output of said logic gate, said clock input is coupled to said first start signal, and said inverted output is coupled to said data input;
- an inverted pulse circuit having an input coupled to said first ON-time pulse and an output generating an inverted pulse, wherein said inverted pulse circuit generates said inverted pulse in response to a logic transition of said first ON-time pulse;
- a third logic circuit having a first input coupled to said compare logic signal, a second input, a third input coupled to said output of said inverted pulse circuit, and generating said second start signal; and
- a delay circuit having an input coupled to said output of said flip-flop and a delay output coupled to said second input of said third logic circuit, wherein said delay circuit delays a logic transition of said delay output.

15. The converter system of claim 1, wherein said first ON-time pulse is generated as an output of a latch set by a first logic state of said first start signal and reset by a first logic state of said first stop signal.

16. The converter system of claim 1, wherein said second ON-time pulse is generated as an output of a latch set by a first logic state of said second start signal and reset by a first logic state of said second stop signal.

17. A computer system comprising:
- one or more central processing units (CPUs);
- a memory for storing instructions and data for said CPUs;
- a power system for supplying power to said computer system;
- a first buck converter coupled to a first regulator input voltage and generating a first converter output voltage for powering a common load in response to a first ON-time pulse set to a first logic state by a first start signal and set to a second logic state by a first stop signal, wherein said first converter output voltage supplies energy to said common load directly from said first regulator input voltage when said first ON-time pulse has said first logic state and said first converter output voltage supplies stored energy from said first regulator input voltage when said first ON-time pulse has said second logic state;
- a second buck converter coupled to a second regulator input voltage and generating a second converter output voltage coupled for powering said common load in response to a second ON-time pulse set to a first logic state by a second start signal and set to a second logic state by a second stop signal, wherein said second converter output voltage supplies energy to said common load directly from said second regulator input voltage when said second ON-time pulse has said first logic state and said second converter output voltage supplies stored energy from said second regulator input voltage when said second ON-time pulse has said second logic state;
- start circuitry for generating said first and second start signals in response to a regulated voltage across said common load, a reference voltage, and said first and second ON-time pulses;

first stop circuitry for generating said first stop signal in response to said first regulator input voltage and said reference voltage; and second stop circuitry for generating said second stop signal in response to a first output current from said first converter output voltage supplied to said common load, a second output current from said second converter output voltage supplied to said common load, and said first ON-time pulse.

18. The system of claim 17, wherein said first stop circuitry comprises:

a capacitor charged by a current from said first regulator input voltage when said first ON-time pulse has said first logic state and discharged when said first ON-time pulse has said second logic state; and first compare circuitry for comparing said reference voltage to a capacitor voltage across said capacitor and generating said first stop signal, wherein said first stop signal has a first logic state when said capacitor voltage is greater than said reference voltage and a second logic state when said capacitor voltage is less than said reference voltage.

19. The system of claim 18, wherein said second stop circuitry comprises:

peak circuitry for generating a peak voltage proportional to a peak value of said first output current;

first sense circuitry for generating a first sense voltage proportional to said second output current; and second compare circuitry for comparing said first sense voltage to said peak voltage and generating said second stop signal, wherein said second stop signal has a first logic state when said first sense voltage is greater than said peak voltage and a second logic state when said first sense voltage is less than said peak voltage.

20. The system of claim 19, wherein said first sense circuitry comprises:

a first sense resistor having a first terminal coupled to said first converter output voltage and a second terminal coupled to said common load; and a differential amplifier having a positive input coupled to said first terminal of said first sense resistor and a negative input coupled to said second terminal of said first sense resistor, and an output generating said first sense voltage.

21. The system of claim 20, wherein said differential amplifier is a transconductance amplifier for converting a voltage across said first sense resistor to a first sense current coupled to a first resistor thereby generating said first sense voltage across said first resistor.

22. The system of claim 19, wherein said peak circuitry comprises:

a second sense resistor having a first terminal coupled to said second converter output voltage and a second terminal coupled to said common load;

a differential amplifier having a positive input coupled to said first terminal of said second sense resistor and a negative input coupled to said second terminal of said second sense resistor, and an output generating said second sense voltage; and a sampling circuit for tracking said second sense voltage when said first ON-time pulse has said first logic state and holding a value of said second sense voltage as said peak voltage when said ON-time pulse has said second logic state.

23. The system of claim 22, wherein said sampling circuit comprises:

a capacitor having a first terminal coupled to ground and a second terminal; and an electronic switch for coupling said second sense voltage to said first terminal of said capacitor when said first ON-time pulse has said first logic state, said capacitor holding said value of said sense voltage as said peak voltage when said first ON-time pulse has said second logic state.

24. The system of claim 22, wherein said differential amplifier is a transconductance amplifier for converting a voltage across said second sense resistor to a second sense current coupled to a second resistor thereby generating said second sense voltage across said second resistor.

25. The system of claim 19, wherein said start circuitry comprises:

a compare circuit for comparing said regulated voltage across said common load to said reference voltage and generating a gate signal having a first logic state when said reference voltage is greater than said regulated voltage and a second logic state when said reference voltage is less than said regulated voltage;

a first select circuit for generating said first start signal in response to said first ON-time pulse, said gate signal, said second start signal, and an initialization signal; and a second select circuit for generating said second start signal in response to said second ON-time pulse, said gate signal, said first start signal, and said initialization signal.

26. The system of claim 25, wherein said first select circuit comprises:

a compare logic circuit for generating a compare logic signal in response to said regulated voltage across said common load, said reference voltage, and said initialization signal;

an initialization pulse circuit for generating an initialization pulse in response to said initialization signal and said compare logic signal;

a first logic circuit for generating said first start signal in response to said first ON-time pulse, said initialization pulse, and said second start signal; and a second logic circuit for generating said second start signal in response to said second ON-time pulse, said initialization pulse, and said first start signal.

27. The system of claim 26, wherein said compare logic circuit comprises:

a comparator for comparing said reference voltage to said regulated voltage across said common load and generating a compare output signal having a first logic state when said reference voltage is greater than said regulated voltage across said common load and a second logic state when said regulated voltage across said common load is greater than said reference voltage; and a logic gate generating said compare logic signal as logic combination of said compare output signal and said initialization signal.

28. The system of claim 27, wherein said initialization pulse circuit comprises:

a logic gate generating a start converter signal as a logic combination of said initialization signal and said compare logic signal; and a pulse circuit generating said initialization pulse in response to a logic transition of said start converter signal.

29. The system of claim 28, wherein said first logic circuit comprises:
- a flip-flop having an output, an inverted output, a data input, a set input, a reset input, and a clock input, wherein said set input is coupled to said initialization pulse, said clock input is coupled to said second start signal, and said inverted output is coupled to said data input;
- a positive pulse circuit having an input coupled to said first start signal and an output coupled to said reset input of said flip-flop and generating a reset pulse in response to a logic transition of said first start signal;
- an inverted pulse circuit having an input coupled to said first ON-time pulse and an output generating an inverted pulse, wherein said inverted pulse circuit generates said inverted pulse in response to a logic transition of said first ON-time pulse;
- a third logic circuit having a first input coupled to said compare logic signal, a second input, a third input coupled to said output of said inverted pulse circuit, and generating said first start signal; and
- a delay circuit having an input coupled to said output of said flip-flop and a delay output coupled to said second input of said third logic circuit, wherein said delay circuit selectively delays a logic transition of said delay output.

30. The system of claim 28, wherein said second logic circuit comprises:
- a positive pulse circuit having an input coupled to said second start signal and an output generating a reset pulse on a logic transition of said second start signal;
- a logic gate having a first input coupled to said initialization pulse, a second input coupled to said output of said positive pulse circuit, and an output generating a gated reset pulse as a logic combination of said initialization pulse and said output of said positive pulse circuit;
- a flip-flop having an output, an inverted output, a data input, a reset input, and a clock input, wherein said reset input is coupled to said output of said logic gate, said clock input is coupled to said first start signal, and said inverted output is coupled to said data input;
- an inverted pulse circuit having an input coupled to said first ON-time pulse and an output generating an inverted pulse, wherein said inverted pulse circuit generates said inverted pulse in response to a logic transition of said first ON-time pulse;
- a third logic circuit having a first input coupled to said compare logic signal, a second input, a third input coupled to said output of said inverted pulse circuit, and generating said second start signal; and
- a delay circuit having an input coupled to said output of said flip-flop and a delay output coupled to said second input of said third logic circuit, wherein said delay circuit delays a logic transition of said delay output.

31. The system of claim 17, wherein said first ON-time pulse is generated as an output of a latch set by a first logic state of said first start signal and reset by a first logic state of said first stop signal.

32. The system of claim 17, wherein said second ON-time pulse is generated as an output of a latch set by a first logic state of said second start signal and reset by a first logic state of said second stop signal.

* * * * *